Patented Dec. 29, 1942

2,306,567

UNITED STATES PATENT OFFICE 2,306,567

FLUORESCENT MATERIAL AND ITS MANUFACTURE

Willard A. Roberts, Euclid, Ohio, assignor to General Electric Company, a corporation of New York No Drawing. Application September 2, 1941, Serial No. 409,269

20 Claims. (Cl. 250—81)

This invention relates to fluorescent lamps and the like, and particularly to a new fluorescent material or phosphor. The invention affords a novel phosphor capable of relatively high efficiency, and adaptable for use in electric discharge devices of the positive column type. This phosphor emits long wave ultraviolet and a little deep blue when excited by short wave ultraviolet radiation. Discharge devices or lamps employing this phosphor are especially useful for blueprinting purposes, and also in cases where "dark light" is used to render dials or other objects luminous by fluorescence or phosphorescence without unwanted visible light. The relatively low visible fluorescence of my phosphor is of advantage in such cases, making it easy to filter out visible light to the point of approximate or total suppression. The high efficiency of my phosphor adapts it especially for installations employing small units where the available power or voltage are low, and where the complication of voltage-raising or other accessories is undesirable.

My present application is a continuation-in-part of my prior application Serial No. 374,738, filed January 16, 1941.

Radiation rich in the spectral region of long ultraviolet and short blue wavelengths (3200 Å. to 4000 Å.) is specially desirable for certain purposes. For example, the papers used for blueprinting and the like are generally more sensitive to these wavelengths, so that hitherto, unactivated calcium tungstate ($CaWO_4$) has proved one of the best phosphors for blueprinting. I have discovered, however, that calcium phosphate can be so activated with cerium as to surpass calcium tungstate in this range when excited by short wave ultraviolet—as, for example, by the 2537 Å. line of the mercury vapor spectrum—and that phosphates of the other alkaline-earth-metals can be activated with cerium in like manner. I have obtained the most efficient cerium-activated phosphors from the normal ortho-phosphates, such as $Ca_3(PO_4)_2$; but I find that other phosphates of the alkaline-earth-metals can also be activated with cerium in about the same way as the normal orthophosphates, such as normal calcium metaphosphate, $Ca(PO_3)_2$, and pyrophosphate, $Ca_2P_2O_7$.

The relative values of the radiation output from normal calcium orthophosphate and calcium tungstate in the range indicated are as follows:

|  | $Ca_3(PO_4)_2$ | $CaWO_4$ |
|---|---|---|
| Above 3400 Å | ¼ | 1 |
| 3200 Å. to 4000 Å | 6.2 | 1 |
| Below 4000 Å | 6.5 | 1 |

Besides the cerium-activated phosphate of calcium cerium-activated phosphates of other cognate metals of group II can be prepared in the same way as hereinafter described for the activation of calcium phosphate, and exhibit generally similar fluorescence—although the efficiency has not proved so high, and larger percentages of cerium have been required with these other phosphates to produce the maximum brightness: viz., about 15% of cerium calculated as such, against about 8% with calcium phosphate. The other phosphates here specially referred to are those of the other two alkaline-earth-metals, strontium and barium; and the procedures and statements of proportions herein given for calcium compounds also apply to the corresponding strontium and barium compounds, with due regard for the different atomic weights of the metals. The comparative brightness obtained with these alkaline-earth-metal phosphate phosphors under excitement by 2537 Å. radiation and the corresponding percentages of activating cerium (calculated as cerium metal) to the phosphate matrix are indicated by the following figures:

| Matrix | Brightness | Percentage of cerium to matrix |
|---|---|---|
| Calcium tungstate | 1.0 | None |
| Calcium phosphate | 6.5 | 8 |
| Strontium phosphate | 4.2 | 15 |
| Barium phosphate | 3.0 | 15 |

The phosphates of alkaline-earth-metals activated with cerium in accordance with my invention are sharply differentiated from previously proposed cerium-activated phosphors in several ways. For example, calcium phosphate activated with cerium has been described as giving a yellow light; whereas my novel phosphor is characterized by radiating in the short blue and the long ultraviolet. Phosphors made by heating phosphorous acid with ceric oxide have been described as giving ultraviolet radiation, and most cerium-activated phosphors as giving blue to ultraviolet; but all these show a very much lower efficiency than my phosphor. Furthermore, the preparation of these prior cerium-activated phosphors has generally involved fusion or hard sintering of the combined ingredients; whereas the preparation of my phosphor is naturally accomplished by heating at temperatures too low for sintering or fusion. Speaking in a general way, the characteristic properties of my novel phosphor are to be attributed to special treatment of essential ingredients, as explained hereinafter.

My phosphor of calcium phosphate activated with cerium may be prepared by firing together material comprising calcium phosphate and cerium. As a vehicle of cerium for thus activating the calcium phosphate may be used cerium phosphate, cerium oxide, cerium nitrate, cerium sulphate, or various other cerium compounds—reagent grades of all the materials used being at present preferred. Ignoring other components of the cerium vehicle, variation in the proportion of cerium to phosphate ranging from 4 per cent to 15 per cent by weight has produced little change in the fluorescent brightness of the phosphor; and even throughout the more extended range of 1 per cent to 20 per cent of cerium, good results have been obtained. Proportions outside this extended range give reduced brightness of the phosphor. Experience has led to the choice of 7 per cent to 8 per cent as an optimum. Comparative figures for calcium phosphate activated with cerium in various proportions are as follows:

| Per cent cerium | Relative brightness |
|---|---|
| 1 | 4.1 |
| 4 | 6.0 |
| 8 | 6.1 |
| 12 | 6.0 |
| 20 | 5.8 |
| 40 | 1.7 |

A preferred method of initially bringing calcium phosphate and cerium compound together for my purpose is by precipitation from solution. This gives rise to a very intimate mixture—or even to a combination including both calcium and cerium in one compound—and also gives rise to advantages in the subsequent firing. For example, 400 grams of calcium nitrate and from 5 to 150 grams of cerous nitrate may be dissolved together in 2 to 3 liters of nearly boiling-hot distilled water, and to this may be added a solution of from 210 to 250 grams of diammonium phosphate, $(NH_4)_2HPO_4$, dissolved in about 2 liters of nearly boiling-hot distilled water. The excess of ammonium phosphate involved in these proportions does not change the quality of the precipitate, but does give a better yield. Solutions cooler than 80° C. offer the drawback that the resulting precipitate may be more difficult to filter. The precipitate comprises essentially (as I have reason to believe) calcium phosphate, $Ca_3(PO_4)_2$, and cerous phosphate, $CePO_4$, very intimately intermixed—though it may be that a double phosphate of calcium and cerium is formed. Naturally, the precipitated calcium phosphate has calcium hydroxide intimately associated or combined with it in a complex according to the formula $3(Ca_3(PO_4)_2) \cdot Ca(OH)_2$, as usual when tricalcium phosphate is formed by precipitation; and this form of the phosphate appears to be partly responsible for the high fluorescent brightness of my phosphor. After thorough stirring of the mixed solutions to assure complete reaction, the precipitate may be collected on a suction filter and washed with 2 or 3 liters of hot water. After washing on the filter, the precipitate may be dried at a temperature of 100° C. to 200° C. The resulting dried powder may then be milled or ground in methanol in a ball-mill for an hour, using about 150 grams of the powder to 250 cc. of pure methyl alcohol in a 1 quart ball-mill. After filtering and drying, the powder may be brushed through 200 mesh bolting cloth. It is then ready for firing.

Besides the duration of firing, the temperature and the chemical, environmental, or atmospheric conditions influence the results and the fluorescent brightness of the product. Temperatures of the order of 950° C., or more, to 1100° C., or more, give good results, with a preference for the upper part of this range, or even about 1200° C. to 1300° C. Temperatures as low as 900° C. give a product of inferior brightness. In general, 1200° C. to 1300° C. is at present preferred, and is to be taken as the temperature of firing in the examples of practical procedure given hereinafter.

To produce a phosphor of the greatest brightness, it is advisable to fire both under reducing conditions and under other influences such as indicated hereinafter. Firing under such diverse conditions or influences may involve separate steps, or may be combined in a single operation. I at present prefer firing the combined precipitate produced as above described under certain diverse conditions or influences concurrently, not only because of the intrinsic advantage of a single operation, but because treatment of the precipitate in this way gives a product of more uniform fluorescence and greater whiteness of appearance by ordinary visible light than does double firing applied as hereinafter described.

The firing is conveniently carried out in an electrically heated silica tube furnace into which the material is introduced in refractory boats, that can be pushed into or through the tube and withdrawn. The desired conditions may be obtained by introducing a supply of moist reducing gas, such as hydrogen, through a tube in a stopper at one end of the furnace, allowing the gas to flow through and burn at the other (open) end of the furnace. The boats should be withdrawn at the end of the furnace where the hydrogen is admitted, for reasons that are explained hereinafter. Very good and uniform results may be obtained by using fairly pure hydrogen that has been bubbled through warm water to moisten it well. However, the proportions of water vapor required with the reducing agent are not large, and can be provided in various ways: e. g., anything that will decompose or react to yield water under the heat used may be introduced with or into the hydrogen in the furnace. The time of firing depends on the temperature: an hour at about 1200–1300° C. is generally adequate. While no advantage arises from prolonging the firing time to two or three hours, neither is there any drawback from such prolongation. Illustrative comparative values of fluorescent brightness for different times of firing of like material are as follows:

| Time | Brightness |
|---|---|
| 10 minutes | 1.8 |
| 30 minutes | 4.7 |
| 1 hour | 5.6 |
| 2 hours | 5.4 |
| 3 hours | 5.7 |

As already intimated, the intermixture or combination of cerium vehicle compound with phosphate may be effected otherwise than by precipitation from solution. For this purpose, the calcium phosphate which I have bought on the market (even of reagent grade) has proved less satisfactory than calcium phosphate which I have prepared: i. e., the purchased calcium phosphate has given a phosphor definitely inferior in brightness to that obtained from the calcium phosphate which I have prepared from other purchased chemicals of reagent quality. Calcium phosphate suitable for my purpose may be made by adding a solution of some calcium salt to a solution of some phosphate in approximately the proportions corresponding to the formula $$Ca_3(PO_4)_2$$

e. g. solutions of calcium nitrate or calcium chloride and of ammonium phosphate may be mixed together. Such precipitated calcium phosphate has calcium hydroxide intimately associated or combined with it in a complex according to the formula $3(Ca_3(PO_4)_2) \cdot Ca(OH)_2$, as explained above in connection with the concurrent precipitation of calcium phosphate and cerium vehicle compound; and this form of the phosphate appears to explain the superiority of my phosphor made from phosphate thus prepared over phosphor from the phosphate brought on the market, as mentioned above. After drying, the calcium phosphate precipitate may be mixed with a solution of the cerium compound used; or this cerium compound solution may be mixed with the wet calcium phosphate precipitate directly after the latter has been washed, without first drying it. In either case, the mixture of cerium compound solution and calcium phosphate may be dried, the resulting dried powder may be milled or ground, and the final dried powder may be brushed through bolting cloth—all as above described in connection with the precipitation of calcium and cerium phosphates together.

With a mixture prepared as here last described, I have hitherto obtained better results by firing under reducing conditions and under another condition or influence as separate steps, rather than combined in one operation. I generally prefer to heat first under oxidizing conditions, as in air or even in oxygen, and then under reducing conditions such as afforded by an atmosphere of hydrogen, preferably moist as above explained with reference to the treatment of the precipitate—although this procedure may be varied. Using the same type of silica tube furnace as already mentioned, suitable conditions may be obtained by leaving both ends of the furnace tube open to the atmosphere for non-reductive treatment, and by introducing a supply of moist hydrogen through a tube in a stopper at one end of the furnace tube for reduction—allowing the hydrogen to flow through and burn at the other (open) end of the furnace tube. When hydrogen is used, the boats should be withdrawn from the tube at the end where the hydrogen is admitted.

The time of firing depends on the temperature and also, to some extent, on the proportion of cerium used. For example, a mixture containing 10 per cent of cerium may be fired in air for an hour at about 1200° C. or 1300° C., and then fired in hydrogen at the same temperature for about 10 minutes; or a mixture containing 8 per cent cerium may be fired in air for half an hour, and then in hydrogen for 10 minutes. Material that has been overreduced may be improved by an air treatment followed by reduction: e. g., by firing in air for 10 minutes and then in hydrogen for 10 minutes.

It is now rather generally accepted that essential conditions for the fluorescence of phosphors are a crystalline structure of the principal material or matrix, and a suitable intimate relation to the matrix material of the crystals, particles, molecules, or atoms embodying the activating element or metal. Principal effects of the firing generally employed in preparing phosphors are that it brings about an activating relation or combination of the activator with the matrix material, as well as crystallization of the latter. It appears that the firing in my process produces effects of this character. There is reason to believe that the reducing conditions or influence during part or all of the firing result in a reduction of ceric compound(s) to cerous, or in maintaining cerous cerium in the cerous state; while the other conditions or influence prevent or remedy any overreduction—whether in the sense of reduction beyond the cerous state, or of reducing too large a proportion of ceric compound to cerous. The relations of simultaneous concurrence or of sequence and of relative duration, etc., between the reducing and the other influences to which the material is subjected need only be such as are effective to prevent conversion of cerous cerium to ceric, or to bring about at least a partial reduction of cerium from ceric to cerous condition; while the temperatures need only be such as are effective to bring about activating relations of the cerium to the alkaline-earth-metal phosphate—preferably without fusion or sintering—since such temperatures will also effect the needful conditioning to give the desired character and efficiency of radiation.

Considering the matter more specifically, the material prepared by precipitation from a solution of alkaline-earth-metal and cerium compounds may comprise, as already stated, normal alkaline-earth-metal phosphate and cerous phosphate. When this material is fired, the cerous cerium is maintained cerous, but is brought into activating relation or combination with the calcium phosphate. The reducing influence prevents the cerous compound from being converted to ceric. The nature of the influence exerted by the water present with the reducing agent or hydrogen is difficult to explain, but appears to be more or less catalytic in the sense of conditioning favorably for the desired reactions: what can be stated positively is that phosphor produced with adequately moist hydrogen shows a fluorescent brightness about 50 per cent to 100 per cent in excess of that shown by phosphor produced with extremely dry hydrogen.

In the case of the mixture prepared, for example, by mixing a solution of cerous nitrate, $Ce(NO_3)_3 \cdot 6H_2O$, with calcium phosphate, the cerous nitrate is presumably changed to ceric oxide in the drying, or at any rate early in the firing operation. The firing in air or under oxidizing conditions doubtless changes the structure of the matrix of calcium phosphate and brings about an activating relation of the cerium to the matrix: this is shown by the fact that fluorescent light is obtainable from this material—though at poor efficiency. The change resulting from firing under reducing conditions should, then, involve a change of cerium from ceric to cerous condition, and possibly some other change—such as conversion of some cerium oxide to cerium phosphate. The influence of the water present with the reducing agent or hydrogen may not differ essentially from its influence in the reductive treatment of the precipitate as described above. As a whole, it may be said that while the changes produced by firing the ceric oxide and calcium phosphate mixture and the structure of the product are evidently largely parallel to those produced by firing the precipitate from a solution of calcium and cerium compounds, it seems equally evident that there are at least differences in the modes or sequences of reactions in the two cases.

As might be gathered from various observations already made, my cerium-activated phosphor produced in the various ways above described is very unusual in its behavior toward temperature and surrounding atmosphere. Heating it in air above about 250–300° C. for an appreciable length of time greatly reduces its brightness or luminous output: indeed, at room temperature the ozone from a small quartz lamp may in 20 minutes reduce the brightness of the phosphor by as much as 80 per cent. On the other hand, heating at 450° C. in a reducing atmosphere has no bad effect on the phosphor, even after 20 minutes.

An ordinary method of applying phosphor to lamps or the like involves suspending the phosphor in a nitrocellulose binder and coating the lamp bulb internally with the phosphor suspension. The bulb is then heated in an atmosphere of ordinary air, thus decomposing the binder and oxidizing the resulting carbon. A very small trace of carbon is left in the phosphor after this treatment, and has the effect of improving the adherence of the phosphor.

Obviously, this treatment is quite impracticable for my phosphor, because of the prolonged heating under oxidizing conditions and temperatures. But by modifying both the binder used and the heat treatment of the lamp bulb or envelope after the application of the phosphor suspension, it is nevertheless possible to apply my phosphor according to this general method without deteriorating the phosphor by the baking-out operation. As regards the binder, the modification consists in reducing the percentage of solids used in it to a very low value without changing the viscosity: this may be done by dissolving highly nitrated nitrocellulose in poor solvents. As regards the heat treatment, the modification may consist in firing for a very short time only in an oven yielding large amounts of radiant heat. The short period of heating does not materially affect the phosphor, yet suffices to remove the small amount of carbon in the binder to the extent necessary to avoid noticeable coloration of the phosphor by the residue thereof.

The following specific example of proportions and procedure may prove helpful to those desiring to use my phosphor:

Dissolve ½ per cent of nitrocellulose of grade ranging from 4000 sec. to 6000 sec. in 99½ per cent of butyl acetate, these proportions being by weight. Using this as binder, mix phosphor and additional solvent therewith in the following proportions:

Binder_____cc__ 50
Butyl acetate_____cc__ 35
Phosphor_____grams__ 50

These ingredients should be milled together in a ball-mill for about ½ hour. The resulting suspension may be applied to the inside of the lamp bulbs in the usual manner. After this, the lamp bulbs may be baked one minute in the oven at 550° C., to bake out all the binder but a very small, innocuous carbon residue, which improves the adhesion of the phosphor to the bulb wall.

The foregoing illustrative method for applying my phosphor is not given as a feature or a limitation of my invention—being, indeed, the subject of application Serial No. 409,293 of Eugene Lemmers, filed September 2, 1941, concurrently herewith, and assigned to the assignee of this application.

What I claim as new and desire to secure by Letters Patent of the United States is:

1. Luminescent material consisting essentially of alkaline-earth-metal phosphate activated with cerium present therein in cerous condition, and characterized by predominant fluorescence in the long wave ultraviolet when excited by short wave ultraviolet radiation.

2. Luminescent material comprising phosphate of alkaline-earth-metal activated with cerium and conditioned for increased radiation by heat under moist reducing conditions, but unfused and unsintered.

3. Luminescent material comprising phosphate of alkaline-earth-metal activated with cerium present therein as cerous compound, but unfused and unsintered.

4. Luminescent material comprising calcium phosphate activated with cerium present therein as phosphate, but unfused and unsintered, and characterized by predominant fluorescence in the long wave ultraviolet when excited by short wave ultraviolet radiation.

5. Luminescent material comprising calcium phosphate activated with cerium present therein as oxide, and characterized by predominant fluorescence in the long wave ultraviolet when excited by short wave ultraviolet radiation.

6. Luminescent material comprising the form of alkaline-earth-metal phosphate produced by precipitation, activated with cerium, and characterized by predominant fluorescence in the long wave ultraviolet when excited by short wave ultraviolet radiation.

7. Luminescent material comprising the form of calmium phosphate produced by precipitation, activated with cerium present therein in cerous condition.

8. A process of activating phosphate of alkaline-earth-metal with cerium to constitute a phosphor which comprises firing the form of alkaline-earth-metal phosphate produced by precipitation, with a cerium compound and under reducing conditions, at temperatures of the order of 950° C. to 1300° C.

9. A process of activating phosphate of alkaline-earth-metal with cerium to constitute a phosphor which comprises firing the form of alkaline-earth-metal phosphate produced by precipitation, with a cerium compound and under the influence of reducing conditions and exposure to water vapor, at temperatures which are effective to bring cerium into activating relation with the phosphate.

10. A process of activating phosphate of alkaline-earth-metal with cerium to constitute a phosphor which comprises firing said phosphate with a cerium compound under reducing conditions at temperatures which are effective to bring cerium into activating relation with the phosphate.

11. A process of activating phosphate of alkaline-earth-metal with cerium to constitute a phosphor which comprises firing said phosphate with a cerium compound under reducing conditions and exposure to water vapor at temperatures below fusion or sintering which are effective to bring cerium into activating relation with the phosphate.

12. A process of activating phosphate of alkaline-earth-metal with cerium to constitute a phosphor which comprises firing said phosphate with a cerium compound at temperatures of the order of 950° C. to 1300° C. under exposure to atmospheric conditions both reducing and moist.

13. A process of activating phosphate of alkaline-earth-metal with cerium to constitute a phosphor which comprises firing said phosphate with a cerium compound in moist hydrogen at temperatures below fusion or sintering which are effective to bring cerium into activating relation with the phosphate.

14. A process of activating phosphate of alkaline-earth-metal with cerium to constitute a phosphor which comprises firing said phosphate with a cerium compound in moist hydrogen at temperatures of the order of 950° C. to 1300° C.

15. A process of activating phosphate of alkaline-earth-metal with cerium to constitute a phosphor which comprises firing material comprising phosphate of cerium as well as of the alkaline-earth-metal at temperatures below fusion or sintering which are effective to bring cerium into activating relation with the phosphate, under the influence of reducing conditions and exposure to water vapor.

16. A process of activating phosphate of alkaline-earth-metal with cerium to constitute a phosphor which comprises firing a precipitate comprising phosphate of cerium as well as of the alkaline-earth-metal at temperatures of the order of 950° C. to 1300° C. under exposure to atmospheric conditions both reducing and moist.

17. A process of activating alkaline-earth-metal phosphate with cerium to constitute a phosphor which comprises firing said phosphate with a reducible cerium compound at temperatures below fusion or sintering which are effective to bring cerium into activating relation with the phosphate, and under atmospheric conditions of exposure to hydrogen and to an oxidizing agent.

18. A process of activating phosphate of alkaline-earth-metal with cerium which comprises firing said phosphate with a cerium compound at temperatures below fusion or sintering which are effective to bring cerium into activating relation with the phosphate, and under the influence of reducing conditions, of exposure to water vapor, and of oxidizing conditions in relations which are effective to bring about partial reduction of a cerium compound from ceric to cerous.

19. A process of activating phosphate of alkaline-earth-metal with cerium to constitute a phosphor which comprises firing said phosphate with cerium compound of the group consisting of cerium oxide and of cerium compounds which break down under heat to form oxide, under exposure to oxidizing and reducing agents at temperatures below fusion or sintering which are effective to bring cerium into activating relation with the phosphate.

20. A process of activating phosphate of alkaline-earth-metal with cerium to constitute a phosphor which comprises firing said phosphate with cerium compound of the group consisting of cerium oxide and cerium compounds which break down under heat to form oxide, at temperatures of the order of 950° C. to 1300° C., under exposure to oxidizing and reducing atmospheric agents.

WILLARD A. ROBERTS.